United States Patent [19]

Millard et al.

[11] Patent Number: 5,495,565
[45] Date of Patent: Feb. 27, 1996

[54] INTEGRATED FORM DOCUMENT EDITOR WITH FORM DESCRIPTOR TABLE, BACKGROUND BITMAP, GRAPHICS EDITOR AND TEXT EDITOR, COMPOSITE IMAGE GENERATOR AND INTELLIGENT AUTOFILL

[75] Inventors: Keith Millard, Merrimack; Geoffrey L. Daley, Nashua, both of N.H.

[73] Assignee: Wang Laboratories, Inc., Billerica, Mass.

[21] Appl. No.: 262,817

[22] Filed: Jun. 21, 1994

[51] Int. Cl.⁶ .................................................. G06F 15/00
[52] U.S. Cl. .............................................. 395/147; 395/149
[58] Field of Search ....................................... 395/146, 147

[56] References Cited

U.S. PATENT DOCUMENTS

| | | | |
|---|---|---|---|
| 4,608,662 | 8/1986 | Watanabe et al. | 395/146 |
| 5,220,649 | 6/1993 | Forcier | 395/148 |
| 5,349,648 | 9/1994 | Handley | 395/148 |

Primary Examiner—Heather R. Herndon
Assistant Examiner—Ben Rocq
Attorney, Agent, or Firm—Kenneth L. Milik

[57] ABSTRACT

A form document editor having a form descriptor table defining editable graphics and text areas with a page comprised of a background bitmap image of a background of the page, a graphics bitmap image of graphics appearing in a graphics area of the page, and a text buffer of text appearing in a text area of the page. The editor includes a graphics editor operating on the graphics bitmap image and a text editor for editing the text in the text buffer. The background and graphics bitmap images and text buffer are combined into a composite page image for display and storage of the form document. A document is retrieved from storage for editing is provided to the editor as a background bitmap. An area of a page may contain autofill data and the editor includes an intelligent autofill data import mechanism for inserting user provided data into the autofill data upon detecting a user data import indicator, with the user data replacing the indicator in the autofill data.

11 Claims, 3 Drawing Sheets

INTEGRATED FORM DOCUMENT EDITOR WITH FORM DESCRIPTOR TABLE, BACKGROUND BITMAP, GRAPHICS EDITOR AND TEXT EDITOR, COMPOSITE IMAGE GENERATOR AND INTELLIGENT AUTOFILL

FIELD OF THE INVENTION

The present invention relates to a method and apparatus for creating and editing documents and, in particular, a method and apparatus for creating and editing form documents including text and graphics elements in a manner analogous to the creating and editing of paper documents.

BACKGROUND OF THE INVENTION

One of the most significant developments in computer systems has been the development of applications programs which allow users to perform their usual and customary tasks in a manner analogous to the manner in which they performed those tasks without computer systems. Examples of such include the electronic spreadsheet such as Lotus 1-2-3[1], and word processing such as Wang Word processing systems wherein users essentially perform financial calculations or generate documents in much the same manner as when they used paper and pencil or typewriters. The use of applications programs running on computer systems to perform these tasks, however, provided such advantages as greater speed, the ability to rapidly perform more complex calculations, the ability to readily edit the work and the convenience of electronic data storage and retrieval.

Recent years have seen the development and adoption of integrated operating environments, such as Microsoft Windows[2] and New Wave[3], for virtually all computer data processing systems. An integrated operating environment is comprised of operating system functions together with a plurality of other functions, such as user interface and data exchange and integration functions, which may be used in common by applications programs executing in the integrated operating environment. Such operating environments and applications programs provide all of the functions and capabilities originally available to users, together with capabilities that would be virtually impossible before the advent of such systems. These new capabilities include the capability to

[1] Lotus and 1-2-3 are trademarks of Lotus Corporation.
[2] Microsoft and Windows are trademarks of Microsoft Corporation.
[3] New Wave is a trademark of Hewlett-Packard Corporation. link data, images or text from one document, worksheet or database into another and the ability to combine text and images and even voice and sound annotations into a single document.

Applications programs such as those for creating and editing documents now offer the features and functions to perform virtually any imaginable operation on a document. A recurring problem, however, is that the focus of the applications programs has shifted from expediting the user's work to providing the most extensive possible array of powerful tools for all possible document creation tasks. As a result, current document processing programs now require the users to invest significant time and effort in learning to use these very powerful but very complex assemblages of tools and functions. In effect, the focus has shifted from allowing users to perform their usual work in the usual way to requiring the users to become document processing experts.

While many potential users of such systems could benefit greatly from the speed, convenience and power of current computerized document processing, they have not been able to do so. The burden in time and effort to learn and use current document processing systems exceeds the benefits to be gained from such systems, and would actually hinder their work by taking up time and effort which must be devoted to their primary tasks. At the same time, currently available document processing applications that are simple to learn and use simply do not have the range or power of features and functionality that would benefit these users.

These users are usually highly skilled and trained professionals who have a need for extensive documentation and have specialized documentation requirements, but cannot devote extensive time to the creation and editing of documentation. As a consequence, these users are characterized by the extensive use of paper forms of various types, wherein the users documentation tasks have been reduced, in so far as possible, to filling in blanks, checking boxes and writing short comments by hand. Examples of such users include doctors, medical technicians and nurses, the police, the court system, insurance investigators, inventory controllers, and even the Examiners of the Patent Office.

The primary problem, therefore, is to bring the power, speed, convenience and features of computerized document processing to users who cannot devote significant effort to learning and using computerized document processing programs and who have specialized document processing needs, usually characterized by the use of forms, and in such a manner as to allow the users to perform their usual work in the manner to which they are accustomed.

The present invention provides a solution to these and other problems of the prior art.

SUMMARY OF THE INVENTION

The present invention provides a form document editor and a method implemented in a computer system for editing a page of a form document wherein the system includes a form descriptor table defining editable graphics and text areas of the page, a background bitmap image of a background of the page, a graphics bitmap image of graphics appearing in a graphics area of the page, and a text buffer of text appearing in a text area of the page.

The system further includes a graphics editor responsive to an analog user input device and having an output to the graphics bitmap image for editing the bitmap image of graphics and a text editor responsive to a user keyboard input device and having an output to the text for editing the text in the text buffer. A composite image generator then receives the background bitmap image, the graphics bitmap image and the text buffer and generates a composite page image to the display to display the page of the form document and the editing of the page of the form document to the user.

The form descriptor table includes a definition entry for each graphics and text area of the page, wherein each definition entry includes a location of the area on the page, an extent of the area on the page, a definition of when the area is to contain a graphic image and when the area is to contain text, and when the area is to contain text, a definition of the line spacing and character size of the text.

According to a present implementation of the invention, a form document is comprised of one or more pages and the pages of the form document are identified and linked by an index file.

The form document editor system of the present invention further includes a mass storage device and the form document editor further includes a composite image generator connected from the background bitmap image, the graphics bitmap image and the text buffer for receiving the background bitmap image, the graphics bitmap image, and the text buffer, generating a composite bitmap image of the page, and providing the composite bitmap image of the page to the mass storage device for storage. Upon subsequent retrieval of a page of a form document from the mass storage device for editing, the composite bitmap image of the stored page is provided to the form document editor as the background bitmap image of the page, rather than decomposing the bitmap image of the stored page into its component background bitmap, graphics bitmap and text buffer so that a previously existing version of a page becomes the background to subsequent editing of the page.

The form document editor system of the present invention thereby maintains and operates upon the component elements of a document, such as a background bitmap, one or more graphics bitmaps and/or one or more text buffers, as separate and independent elements, combining the component elements of the document into a single, composite entity only for the purposes of display and storage. The editor of the present invention thereby provides a simpler and more flexible system wherein the text and graphics editors, each of which is required to perform only a limited range of closely related functions, can each be much simplier than in the systems of the prior art which attempt to provide all functions through a single, complex, all inclusive and all purpose document processing editor.

The editor of the present invention is further provides a simple and flexible means for adding new forms to the system in that each form is completely defined by a simple form definition table and a background bitmap. A form definition table can be easily and readily generated by a simple table editor and a background bitmap can be readily generated either by any of a wide range of graphics programs or by scanning of an existing form.

Finally, the editor of the present invention further, and as a consequence, provides a simpler, more flexible and easier to learn user interface particularly suited for the needs and operations of users characterized by extensive user of forms based documentation. The forms document editor of the present invention allows users to continue performing their accustomed form documentation tasks in the same manner as before, and thereby requires little effort, study or adaptation by a new user.

The form document editor system may further include an image compressor for receiving the composite bitmap image of the page and compressing the composite bitmap image of the page into a compressed format for storage in the mass storage device. When a page is retrieved from mass storage, the image compressor receives the compressed bitmap image of the page from the mass storage device and decompresses the compressed bitmap image of the retrieved page to generate a decompressed composite bitmap image of the stored page.

The form document editor of the present invention also allows an area of the page to contain autofill data, wherein the description entry corresponding to the page area including autofill data contains a reference to the autofill data. The text editor is responsive to the description entry reference to the autofill data for retrieving the autofill data and inserting the autofill data into the area of the page containing the autofill data.

The present invention also provides an intelligent autofill data import mechanism for inserting user provided data into autofill data wherein the autofill data includes a user data import indicator that user data is to be entered into the autofill data by the user, the user data import indicator being located in the autofill data at the location the user data is to be entered by the user. The autofill data is provided to a text editor for insertion into the text data of a document through an autofill parser which reads the autofill data to the text editor to be entered into the text buffer by the text editor and which detects the presence of a user import data indicator in the autofill data.

Upon detecting a user import data indicator, the autofill parser halts the reading of the autofill data to the text editor and prompts the user regarding the data to be entered into the autofill data by the user and resumes reading of the autofill data to the text editor when the user has entered the user data. The autofill data thereby appears in the document in the form that it was originally provided to the editor, except that the user provided data will appear in the autofill data in substitution for, and in the same locations as, the indicators for user provided data in the original version of the autofill data.

The intelligent autofill data mechanism also provides that a user data import indicator may include a prompt message to the user indicating the user data to be entered by the user, wherein the autofill parser will respond to a prompt message in a user data import indicator by providing the prompt message for display to the user.

Other features, objects and advantages of the present invention will be understood by those of ordinary skill in the art after reading the following descriptions of a present implementation of the present invention, and after examining the drawings, wherein:

DESCRIPTION OF THE INVENTION

It will be assumed in the following detailed description of the present invention that the integrated operating environment in which the invention is implemented is comprised of Microsoft Windows, together with the functionality and capabilities of Microsoft Windows as used to implement the present invention. The functionality and capabilities of Microsoft Windows are well known to those in the relevant arts and is well described in readily available publications, such as "Windows 3.1 Programmer's Reference" by James W. McCord and published by Que Corporation and "Inside OLE 2" by Kraig Brockschmidt and published by Microsoft Press.

Those of skill in the relevant arts will readily understand from the following description of the present invention how to implement the present invention using the functionality and capabilities of Microsoft Windows and how to adapt the present invention to other operating system environments, such as New Wave and Macintosh[4]. As such, the following description of the invention will include only such detail as is necessary to understand the implementation and operation of the present invention, but will not include a detailed description of the elements of Microsoft Windows that are used to implement the present invention as such detailed descriptions of these elements are readily and publicly available, as in the above referenced publications.

A. Form Document Data Structures (FIGS. 1, 2 and 3)

Figure 1:
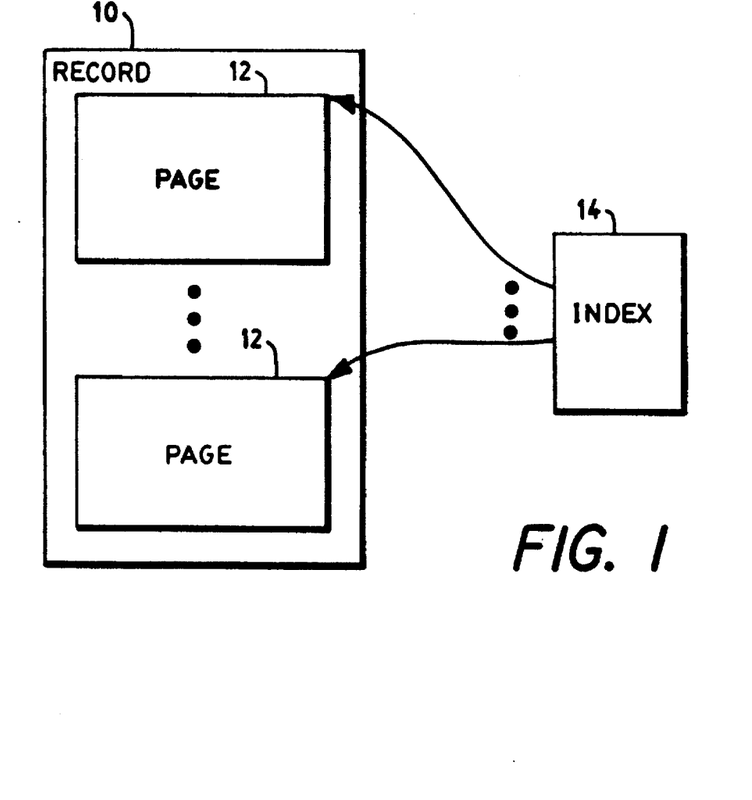
FIG. 1 is a diagrammatic representation of a record and record pages of the forms of the pro/sent invention.
Figure 2:
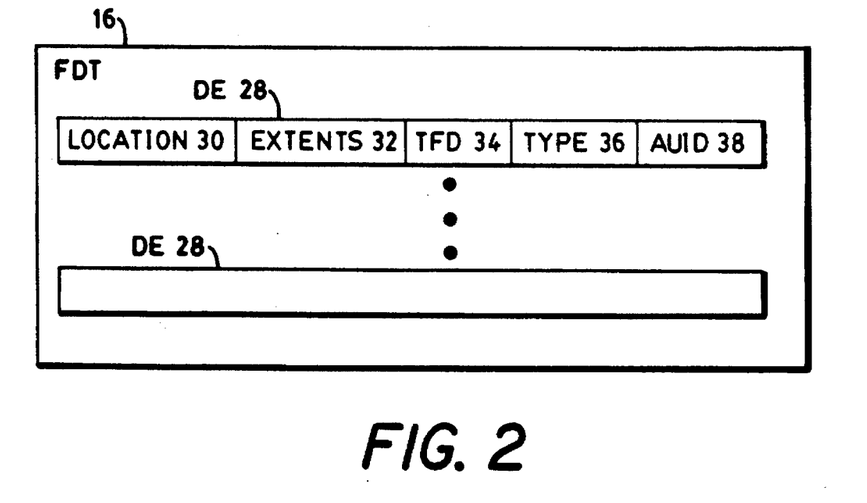
FIG. 2 is a diagrammatic representation of a form definition table of the forms of the present invention.
Figure 3:
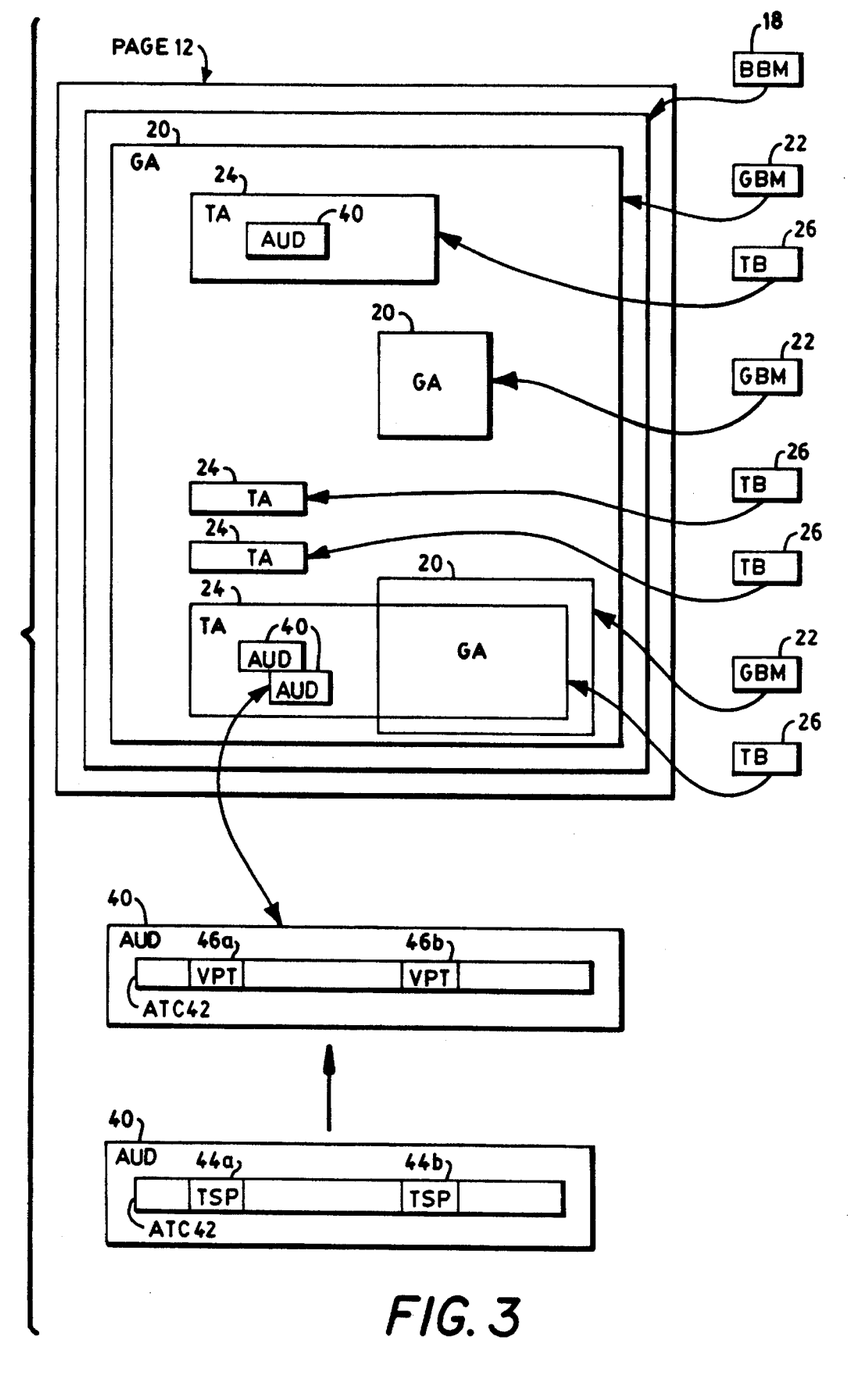
FIG. 3 is a diagrammatic representation of a page and page bitmaps of the forms of the present invention.

Referring to FIGS. 1, 2 and 3, therein is shown diagrammatic representations of the component data structures of a form document of the form document creation and editing system and method of the present invention. As indicated in FIG. 1, in the present implementation of the system and method of the present invention, each Record 10 comprising a form document is comprised of one or more Pages 12 wherein, for convenience and simplicity of handling the file management operations for the Pages 12, each Page 12 is an individual file or object. The Pages 12 of a Record 10 are then associated with one another to form a Record 10 by an Index File (Index) 14.

In alternate implementations, the Pages 12 of a Record 10 may be contained within a single file or object, with the relationship between the Pages 12 being defined by the internal structure and format of the file, or object, thereby eliminating the need for an Index 14 for each Record 10.

As represented in FIGS. 2 and 3, each page of a form document is defined by a Form Definition Table (FDT) 16 and one or more Background Bit Maps (BBMs) 18 and may include one or more Graphic Areas (GAs) 20, each defined by a Graphic Bit Map (GBM) 22, and one or more Text Areas (TAs) 24, each defined by a Text Buffer (TB) 26.

Each BBM 18 contains a bitmap of the background image of a Page 12 or a portion of a Page 12 and comprises the text, lines, borders and images appearing on a "blank" copy of a form. In the present implementation this background image data is not modifiable by the user but is provided from a library of background

[4] Macintosh is a trademark of Apple Computer Corporation. image bitmaps generated, for example, by a separate graphic application program or as scanned images.

Each GA 20 is an area of the Page 12 containing user entered data in the form of a graphic image or images and the graphic image or images in a given GA 20 are contained in a corresponding GBM 22. As will be described further below, the graphic image data may be entered directly by the user, for example, by use of a graphics editor, or by linking or copying in from another file or object containing the graphic data and may be modified by the user. The graphic data appearing in a GA 20 and stored in the corresponding GBM 22 may include handwritten script which can be entered by the user using a pen type device and which will appear as image data.

Each TA 24 is an area of the Page 12 containing user entered data in the form of text and the text in a given TA 24 is stored in a corresponding TB 26 as an array of ASCII characters. Text data is entered by the user through a keyboard and text editor, is modifiable by the user, and may also include autofilled data.

Finally, each FDT 16 is comprised of a plurality of Definition Entries (DEs) 28 wherein each DE 28 either identifies a BBM 18, a GA 20 or a TA 22, wherein the GBM 22 associated with the GA 20 or the TB 26 associated with the TA 22 will be allocated in MEM 52 by the system operating in response to the FDT 16.

Each DE 28 defines the Location 30 and Extents 32 of the GA 20 or TA 24 in the Page 12, usually by identifying the x,y coordinates of a corner of the area on the page and the length and width of the area with respect to the x,y dimensions of the Page 12. The x,y coordinates and dimensions of the areas are expressed in pixels or image bits of the Page 12 for convenience and ease of creation and editing in the present implementation of the system and method because the areas of a Page 12 and the graphic and text data appearing in the areas of a Page 12 are defined as bitmapped images. Other coordinate and dimensional conventions may be used in alternate embodiments of the system, such as dimensions in centimeters, inches or points, with corresponding adaptations in the graphics and text editors that will be well understood by those of skill in the relevant arts.

Each DE 28 associated with a TA 24 and its associated TB 26 will also contain Text Format Data (TFD) 34 which defines the orientation and spacing of lines of text entered into the TA 24 and associated TB 26, and the size and spacing of the characters.

It has been described above that each DE 28 defines the locations and extents of a corresponding GA 20 or TA 24. In accordance with these definitions, a graphics or text editor operating on a GA 20 or TA 24 will not enter data in the areas outside of the defined GA 20 or TA 24. That is, a drawn line or script or imported image will stop at the edge of a GA 20 and text entered into a TA 24 will enter according to the defined line and character spacing and size definitions and will word wrap when the edge of the TA 24 is reached. When the bottom of the TA is reached, that is, when the defined TA 24 and TB 26 is full, the associated TB 26 will accept no more text.

As will be described further below, the GAs 20 and TAs 24 of a Page 12 and their associated GBMs 22 and TBs 26 are essentially independent of all other GAs 20 and TAs 24 of the Page 12, so that GAs 20 and TAs 24 may overlap on a Page 12. For example, it is possible to define a GA 20 or TA 24 which essentially occupies the entirety of a Page 12, so that a user, for example, may thereby "handwrite" script annotations at any point on the Page 12. The sole exception to overlapping areas is that, in the present implementation of the invention, TAs 24 are not allowed to overlap due to the complexities in managing overlapping TAs 24.

As will also be described below, the various GAs 20 and TAs 24 of a Page 12 are ORed to compose the image of the Page 12, so that the graphic and text data of overlapping GAs 20 and TAs 24 will overlap on the composite representation of the Page 12. A user may thereby import a graphic image into a GA 20 of a Page 12 and annotate that image with "hand drawn" or "hand written" drawing or script in that GA 20 or in an overlapping GA 20 or with "typed" character text in an overlapping TA 24.

Each DE 28 may further include a Type Identification (Type) 36 of the type of data appearing in the corresponding GBM 22 or TB 26 and this information is used to control the types of data that may be entered by a user into the corresponding GA 20 or TA 24. In this regard, the present implementation identifies a given area as a GA 20 or as one of three types of TA 24. Of the three types of TA 24, the first is a "plain text" TA 24, wherein the text data is entered entirely by the user and may be modified or edited at will by the user. The second type of TA 24 is an "autofill with plain text" TA 24 wherein part of the text data is autofilled text and part is entered and modified or edited at will by the user. The third is a "display only autofill" TA 24 wherein the text data is entirely autofill data and wherein the user may not modify or edit the text in the area.

With respect to the above described types of TAs 24 which may contain autofilled data, the associated DE 28 may further include one or more Autofill Identifications (AUIDs) 38 of Autofill Data (AUD) 40 which is to appear in the corresponding TA 24. AUD 40, in turn, is text data which is automatically filled into a TA 24 when the corresponding Page 12 is invoked for creation or editing and, for example, may be linked or automatically copied or updated from another file or object. It should be noted that while the references to autofill data are represented herein as being resident in the corresponding DE 28, these references may alternately be embedded in the data of the corresponding TB 26 in the manner well known to those with the object linking and embedding functions of Microsoft Windows.

Finally, and as will be described in further detail below in the description of a system implementing the present invention, the form document editor of the present invention implements an intelligent text import mechanism. In intelligent text import, an AUD 40, which is comprised of a string or Array of Text Characters (ATC) 42, may contain one or more Text Substitution Prompts (TSPs) 44 embedded in the ATC 42 wherein each TSP 44 indicates a position in the autofill text data wherein corresponding User Prompted Text (UPT) 46 is to be entered by the user. This operation is illustrated in FIG. 3 by TSPs 44a and 44b appearing in ATC 42 of the original, stored version of an AUD 40 and corresponding UPTs 46a and 46b appearing in the ATC 42 of the version of the AUD 40 which appears in the TA 24 that the autofill text is inserted into.

Each TSP 44 is located in the autofill text data, that is, in the ATC 42, at the location the user entered data, that is, the UPT 46, is to appear and contains a prompt message to the user indicating to the user what text data should appear in the corresponding UPT 46, either directly or by linking or reference to a prompt message stored elsewhere. As will be described below, the text import mechanism will substitute the UPT 46 text data entered by the user for the corresponding TSP 44 originally appearing in the AUD 40. The ATC 42 of the AUD 40 will thereby appear in the TA 24 with UPTs 46 in place of and in the same locations as the TSPs 44 in the original version of the ATC 42 of the AUD 40. The ATC 42 of the AUD 40 will thereby become part of the Page 12 generated by the user, but with the user entered UPTs 46 in place of the TSPs 44.

B. Form Document System (FIG. 4)

Figure 4:
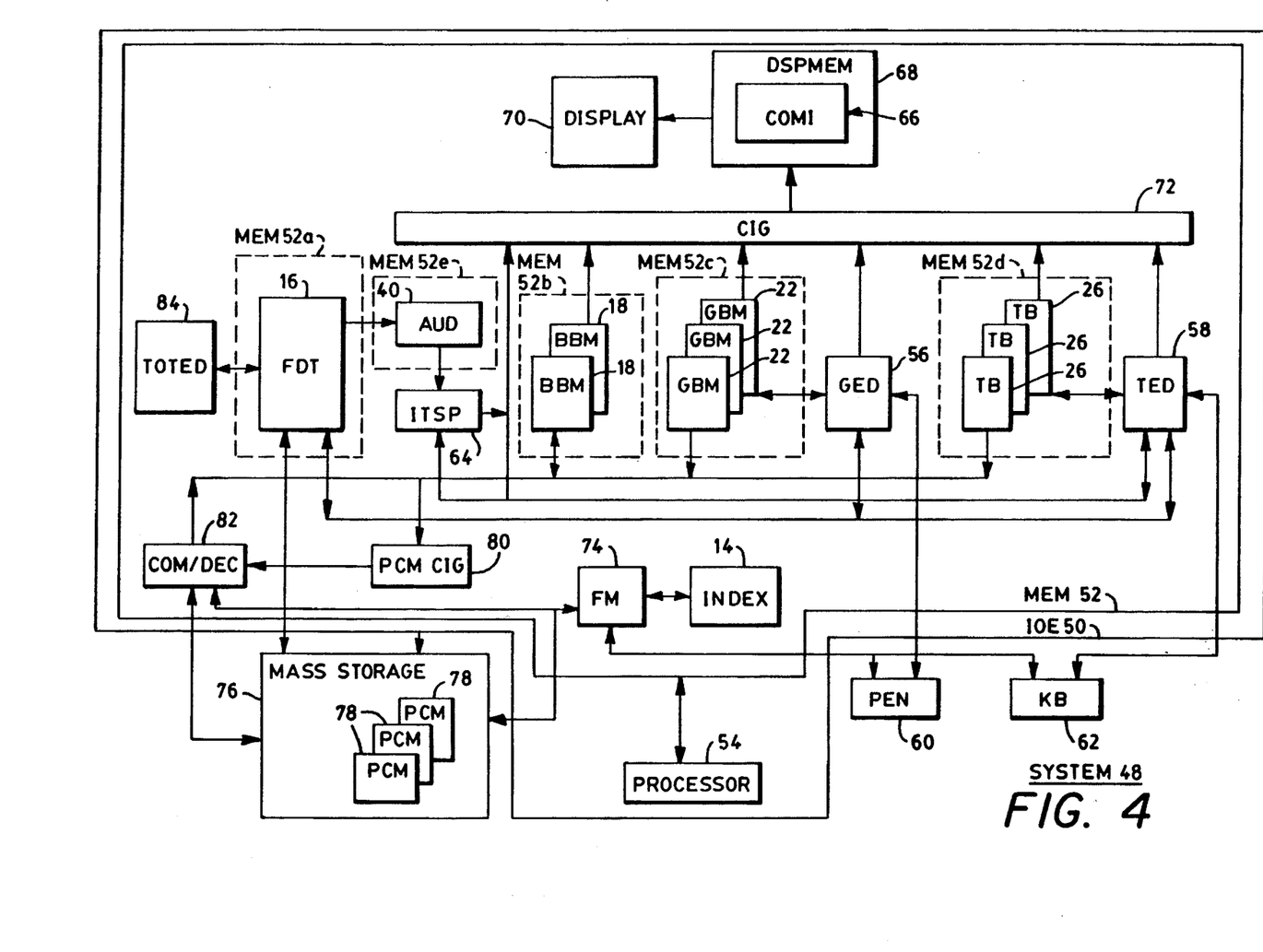
FIG. 4 is a diagrammatic representation of a system implementing the present invention.

Referring to FIG. 4, there in presented a diagrammatic representation of a System 48 implementing the form document creation and editing system of the present invention. As described above, present invention is implemented in an integrated operating environment, such as Microsoft Windows, and the general and well understood functionality and capabilities of the integrated operating environment is used to implement the present invention. As such, many of the functions, such as those implemented through Application Program Interface (API) calls to the functions implemented in the operating environment will not be shown in detail.

As represented in FIG. 4, the FDT 16 and the BBMs 18, GBMs 22 and TBs 26 of the Page 12 presently being operated upon and the integrated operating environment (IOE) 50 reside in assigned areas of a System 48 Memory Space (MEM) 52, respectively designated as MEM 52a, MEM 52b, MEM 52c and MEM 52d, and are operated upon by and use various control and editing mechanisms operating through a Processor 54. As is well understood in the art, MEM 52 includes System 48's operating memory, such as random access memory, and System 48's storage memory, which may include disk drives, tape units, file servers, and other systems.

Associated with GBMs 22 and TBs 26 are, respectively, a Graphics Editor (GED) 56 and a Text Editor (TED) 58, which will usually reside in MEM 52, operate within IOE 50 and operate upon GBMs 22 and TBs 26 through Processor 54. GED 56 and TED 58 may be editors designed specifically for System 48 or purchased editor programs having the necessary capabilities, both of which are well understood and common in the art. GED 56 and TED 58 may also be implemented largely or wholly through the functions provided within IOE 50, again as well understood in the art.

GED 56 operates with and upon graphics elements, that is, lines, graphic shapes, and "handwritten" script text, and accordingly preferably receives its primary inputs from an analog device, such as a mouse, a trackball or, preferably, a pen and tablet. GED 56's primary input is therefore represented as provided from a pen and tablet device designated as Pen 60. TED 58 operates with and upon text comprised of characters and accordingly receives its primary inputs, that is, text characters and text editing commands, from a Keyboard (KB) 62. It should be noted, however, that certain inputs to GED 56 and TED 58 may be provided from either of Pen 60 or KB 62. For example, menu control and pick inputs to both GED 56 and TED 58 may be provided from either or both of Pen 60 or KB 62, that a Pen 60 input may be used to indicate the location of TED 58's text entry cursor, and that the Pen 60 input may be used to designate blocks of text to be operated upon by TED 60, as in text copy, cut and move operations As indicated, GED 56 and TED 58 are provided with data access to FDT 16, thereby reading the DEs 28 stored therein to determine the respective GAs 20 and TAs 24 in which they may operate, the locations and extents of the GAs 20 and TAs 24, and, in the instance of TED 58, the line and character spacing and size defined for each TA 24.

TED 58 will also use the information from the DEs 28 to determine whether there is autofill data associated with a TA 24 in which the editor is presently operating and will use this information to access the autofill data. As described previously, autofill data may be linked from another source through the functions of IOE 50, as provided by the object linking and embedding functions of Microsoft Windows and similar IOEs 50, and GED 56 or TED 58 will issue to appropriate call to invoke the automatic fill of the data. The autofill data residing in one or more AUD 40s is represented in FIG. 4 as residing in yet another assigned area of MEM 52, designated therein as MEM 52e.

As described, the ATC 42 of an AUD 40 may contain one or more TSPs 44 wherein each TSP 44 indicates a position in the autofill text data wherein corresponding UPT 46 is to be entered by the user in substitution for the TSP 44. The intelligent text import operation is performed through Intelligent Text Substitution Parser (ITSP) 64 which, as indicated in FIG. 4, has an input from the AUDs 40 to receive the text characters of an AUD 40's ATC 42 being inserted into an autofill area of a TA 24, and an autofill text output to TED 58. TED 58 receives the text characters of the ATC 42 of the AUD 40 and inserts the text characters into the TA 24's TB 26 in the same manner as text characters entered by a user through KB 62.

ITSP 64 parses the string of text characters of the ATC 42 of an AUD 40 being read to TED 58 for insertion into a TB 26 to detect the presence of each TSP 44 therein. Upon detecting a TSP 44, ITSP 64 will halt the reading of the text characters to TED 58 and provide the prompt message contained in the TSP 44 to be displayed to the user to prompt or advise the user regarding the text, that is, the UPT 46 text characters to be entered into this location in the ATC 42 of the AUD 40. The user will then use KB 62 to enter the prompted alphabetic or numeric characters and will signal to ITSP 64 that the UPT 46 text has been entered, for example, by entering a RETURN or ENTER keystroke. ITSP 64 will then resume reading the characters of the ATC 42 to TED 58 until either the end of the ATC 42 is reached or until another TSP 44 is detected, at which point the steps just described will be repeated.

It should be noted that in implementations of System 48 which do not include intelligent text import, ITSP 64 will not be present and AUD 40 text data will be provided directly to TED 58.

Next considering the generation of the composite Page 12 image to be displayed to the user as the user edits or modifies the original form document, the graphics and text image data generated by and operated upon by GED 56 and TED 58 have been previously described as stored in GBMs 22 and TBs 26, respectively, and GED 56 and TED 58 accordingly have interfaces with GBMs 22 and TBs 26 for these purposes.

As previously described, the background, graphics and text image elements comprising a Page 12 and stored in BBM 18, GBM 22 and TB 26 are combined by an ORing operation to create the Composite Image (COMPI) 66 of the Page 12, which resides in a Display Memory (DSPMEM) 68 and which is displayed to the user through a Display 70. As represented in FIG. 4, this ORing operation is performed through an Composite Image Generator (CIG) 72, which may be implemented through Processor 54 or through a dedicated graphic processor. As shown in FIG. 4, CIG 72 receives image data inputs from BBM 18, GBM 22 and TB 26 and TSP 44 prompt message data from ITSP 64. CIG 72 then combines these image elements into the composite Page 12 image, COMI 66, in DSPMEM 68.

In this regard, it should be noted that, in alienate implementations of System 48, Display 70 and the touch tablet of Pen 60 may be combined into a single element, for example, as in the "touch screen" or touch digitizing displays found in the various forms of "clipboard" computers.

It will also be noted in FIG. 4 that, in the present implementation of System 48, CIG 72 is provided with direct data interfaces with GED 56 and TED 58 and that GED 56 and TED 58 may thereby generate graphics and text image data directly to CIG 72 and thereby to the COMI 66 residing in DSPMEM 68. This direct path from GED 56 and TED 58 to CIG 72 is provided in the present implementation of System 48 to reduce the time required to enter graphics and text image elements into COMI 66 and may be implemented, for example, through the functions provided within IOE 50, such as the Microsoft Windows TEXTOUT function.

In the illustrated implementation of System 48, therefore, BBMs 18, GBMs 22 and TBs 26 operate as buffer storage to receive background, graphics and text images comprising Pages 12 from mass storage, as the source providing the background, graphics and text images comprising Pages 12 to mass storage, and to store these images of the Pages 12 for repainting or regeneration of the COMPI 66 in DSPMEM 68. In alternate embodiments of System 48, the alternate paths directly from GED 56 and TED 58 to CIG 72 may not be required or desirable and BBMs 18, GBMs 22 and TBs 26 will be the sole source of image data to CIG 72.

In the presently preferred embodiment of System 48, the BBMs 18, GBMs 22 and TBs 26 comprising the Pages 12 of a Record 10 are all contained in MEM 52 concurrently to increase the speed of operation of the system by avoiding the swapping of files to and from mass storage. In certain instances, however, the bitmap data comprising the Pages 12 of a Record 10 may exceed the capacity of MEM 52 and it may become necessary to swap bitmaps to and from a mass storage device as needed. In this instance, System 48 may, as indicated in FIG. 4, further include a File Manager (FM) 74, which receives control inputs from KB 62 and, very probably, from Pen 60. FM 74 will perform the file management functions necessary to store and retrieve FDTs 16, BBMs 18, GBM 22 and TBs 26 to and from Mass Storage 76 as the Pages 12 of a Record 10 are operated upon. As indicated, FM 74 constructs and operates with the Index 14 of the Record 10 currently being operation upon, in the manner will known in the art. FM 74 may be designed specifically for System 48 or a purchased file manager program having the necessary capabilities, or may be implemented largely or wholly through the functions provided within IOE 50, again as well understood in the art.

The Pages 12 of Records 10 are stored in Mass Storage 76 and retrieved from Mass Storage 76 in the form of Page Composite Images (PCMs) 78 wherein each PCM 78 is comprised of the BBMs 18, GBMs 22 and TBs 26 of a Page 12. As indicated in FIG. 4, a Page 12 is stored as a PCM 78 in Mass Storage 76 by reading the BBMs 18, GBMs 22 and TBs 26 of the Page 12 from MEMs 52b, 52c and 52d and combining the individual bit maps into a single composite PCM 78 by operation of a PCM CIG 80, which operates in a manner similar to CIG 72 and which may be implemented in the same manner as CIG 72. CIG 72 itself may also be used for this function. When a PCM 78 of a Page 12 of a Record 10 is read from Mass Storage 76 to be operated upon, the PCM 78 is not broken down into the individual background, graphics and text bit maps, however, but is instead read into System 48 as a BBM 18, thereby becoming the background image to which new graphics and text image data may be added by operation of GED 56 and TED 58 operating on new graphics and text data generated in new GBMs 22 and TBs 26 generated by GED 56 and TED 58.

Finally, it is apparent from the above descriptions of System 48 and the data structures thereof that the Pages 12 of a Record 10 are comprised of image data, which thereby imposes significant storage space requirements. For this reason, System 48 further includes a Compression/Decompression Function (COM/DEC) 82 operating under control of FM 74 which is used to compress and decompress PCMs 78 as the PCMs 78 are read from and written to Mass Storage 76. In the present embodiment of System 48, the PCMs 78 comprising the stored copies of the Pages 12 of Records 10 are stored as a compressed file in TIFF file format. Also, and because the user of System 48 frequently have a requirement to generate unalterable copies of Records 10, for example, for legal purposes, as well as a need for storing significant quantities of data, Mass Storage 76 may be comprised of optical disk storage devices, as well as or in addition to, magnetic disk or tape storage devices. The use of an optical storage device, such as an optical CD disk, will result in permanent copies of each successive edited version of each of Record 10.

It should also be noted that Mass Storage 76 need not be connected directly from System 48, but may be implemented through a communications connection to another computer system or a server system providing the Mass Storage 76 functions.

Lastly, System 48 may also include an FDT Editor (FDTED) 84 operating under control inputs provided from KB 62, and possibly from Pen 60, for generating or editing FDTs 16 or the DEs 28 of an FDT 16. Such editors are well known in the art and may be designed specifically for System 48, or may be a purchased editor having the necessary functions, or may be implemented through the functions provided in IOE 50. In this instance, new or modified FDTs 16 will be managed, as are the pre-generated FDTs 16, though FM 74.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a computer system including a memory for form documents to be operated upon, a processor for operating on the form documents and a display for displaying the form documents, each form document containing at least one page, a form document editor for editing a page of a form document, comprising:

a form document data structure, including
      a form descriptor table defining editable graphics and text areas of the page, wherein the form descriptor table includes
         a definition entry for each graphics and text area of the page, each definition entry including
            a location of the area on the page,
            an extent of the area on the page, and
            a definition of when the area is to contain a graphic image and when the area is to contain text, and
               when the area is to contain text, a definition of the line spacing and character size of the text.
      a background bitmap image of a background of the page,
      a graphics bitmap image of graphics appearing in a graphics area of the page, and
      a text buffer of text appearing in a text area of the page,
   a graphics editor responsive to an analog user input device and to the form descriptor table and having an output to the graphics bitmap image for editing the bitmap image of graphics,
   a text editor responsive to a user keyboard input device and to the form descriptor table and having an output to the text for editing the text in the text buffer, and
   a composite image generator responsive to the form descriptor table for receiving the background bitmap image, the graphics bitmap image and the text buffer and generating a composite page image to the display, and
   the text editor and an autofill data parser for generating an area of the page to contain autofill data that includes user entered data, wherein
      the description entry corresponding to the page area including autofill data contains a reference to the autofill data, and
      the autofill data contains a user data import indicator that user data is to be entered into the autofill data by the user,
         the user data import indicator being located in the autofill data at the location the user data is to be entered by the user, and
   the text editor being responsive to the description entry reference to the autofill data for,
      retrieving the autofill data, and
      inserting the autofill data into the area of the page containing the autofill data, and
   the autofill data parser being responsive to the autofill data for
      reading the autofill data to the text editor to be entered into the text buffer by the text editor,
      detecting the presence of a user import data indicator
      halting the reading of the autofill data to the text editor for entry of the user data (46) by the user, and
      resuming reading of the autofill data to the text editor when the user has entered the user data.

2. The form document editor of claim 1, wherein a form document is comprised of one or more pages and the pages of the form document are identified and linked by an index file.

3. In a computer system including a memory for form documents to be operated upon, a processor for operating on the form documents and a display for displaying the form documents, each form document containing at least one page, a form document editor for editing a page of a from document comprising:

a form document data structure, including
      a form descriptor table defining editable graphics and text areas of the page,
      a background bitmap image of a background of the page,
      a graphics bitmap image of graphics appearing in a graphics area of the page, and
      a text buffer of text appearing in a text area of the page,
   a graphics editor responsive to an analog user input device and to the form descriptor table and having an output to the graphics bitmap image for editing only the bitmap image of graphics,
   a text editor responsive to a user keyboard input device and to the form descriptor table and having an output to the text for editing only the text in the text buffer,
   a composite image generator responsive to the form descriptor table and connected from the background bitmap image, the graphics bitmap image and the text buffer for
      receiving the background bitmap image, the graphics bitmap image, and the text buffer,
      generating a composite bitmap image of the page wherein the composite bitmap image is comprised of the background bitmap image, the graphics bitmap image and the text buffer, and
      providing the composite bitmap image of the page to the mass storage device for storage as a new background bitmap image of the page for a next editing of the document, wherein
         the new background bitmap image of the page incorporates all text and graphics data entered by a user in a present editing of the document and is unchangeable in any subsequent editing of the document, wherein
            the new background bitmap image is provided to the form document editor as the background bitmap image of the page when the page is retrieved from the mass storage device for editing and the graphics editor can edit only the graphics bitmap image and the text editor can edit only the text buffer.

4. The form document editor of claim 3 wherein the composite bitmap image of a stored page is provided to the form document editor as the background bitmap image of the page when the page is retrieved from the mass storage device for editing.

5. The form document editor of claim 3, further comprising
   an image compressor for
      receiving the composite bitmap image of the page representing the new background bitmap image and compressing the composite bitmap image of the page into a compressed format for storage in the mass storage device as the new background bitmap image, and receiving the compressed new background bitmap image of a page retrieved from the mass storage device, decompressing the compressed new background bitmap image of the retrieved page to generate a decompressed new background bitmap image of the stored page, and providing the decompressed new background bitmap image of the retrieved page is provided to the background memory as the background bitmap image of the page for editing of the page.

6. The form document editor of claim 1, wherein:

a user data import indicator includes a user prompt message indicating the user data to be inserted, and the autofill parser is responsive to the user prompt message for providing the user prompt message to the display for display to the user.

7. In a computer system including a memory for form documents to be operated upon, a processor for operating on the form documents and a display for displaying the form documents, each form document containing at least one page, a method for editing a page of a form document, comprising the steps of:

storing a form document data structure, including
a form descriptor table defining editable graphics and text areas of the page,
the form descriptor table including a definition entry for each graphics image and text area of the page, each definition entry including
a location of the area on the page,
an extent of the area on the page,
a definition of when the area is to contain a graphic image and when the area is to contain text, and
when the area is to contain text, a definition of the line spacing and character size of the text,
a background bitmap image of a background of the page,
a graphics bitmap image of graphics appearing in a graphics area of the page, and
a text buffer of text appearing in text area of the page, editing the graphics bitmap image by operation of a graphics editor responsive to an analog user input device and to the form descriptor table and having an output to the graphics bitmap image.

editing the text buffer by operation of a text editor responsive to a user keyboard input device and to the form descriptor table and having an output to the text buffer, and generating a composite page image by receiving the background bitmap image, the graphics bitmap image and the text buffer and responsive to the form descriptor table combining the background bitmap image, the graphics bitmap image and the text buffer into a composite page image to the display, and inserting autofill data including user entered data into an area of the page by
inserting a reference to the autofill data into the description entry corresponding to the page area including the autofill data, and
inserting a user data import indicator into the autofill data,
the user data import indicator indicating that user data is to be entered into the autofill data by the user, and being located in the autofill data at the location the user data is to be entered by the user, and by operation of the graphics and text editors in response to the description entry reference to the autofill data, retrieving the autofill data, and
inserting the autofill data into the area of the page containing the autofill data, including,
by operation of an autofill data parser
reading the autofill data to the text editor to be entered into the text buffer by the text editor,
detecting the presence of a user import data indicator,
halting the reading of the autofill data to the text editor for entry of the user data by the user, and
resuming reading of the autofill data to the text editor when the user has entered the user data.

8. The method for editing a page of a form document of claim 7, wherein a form document is comprised of one or more pages, further comprising the steps of:

identifying and linking the pages of the form document by an index file.

9. In a computer system including a memory for form documents to be operated upon a processor for operating on the form documents and a display for displaying the form documents, each form document containing at least one page, a method for editing a page of a form document, comprising the steps of:

storing a form document data structure including,
a form descriptor table defining editable graphics and text areas of the page,
a background bitmap image of a background of the page,
a graphics bitmap image of graphics appearing in a graphics area of the page, and
a text buffer of text appearing in a text area of the page, editing the graphics bitmap image by operation of a graphics editor responsive to an analog user input device and to the form descriptor table and having an output to the graphics bitmap image, editing the text buffer by operation of a text editor responsive to user keyboard input device and to the form descriptor table and having an output to the text buffer, and generating a composite image of the page by
receiving the background bitmap image, the graphics bitmap image appearing in a graphics area of the page, and the text buffer appearing in a text area of the page,
generating a composite bitmap image of the page, and
providing the composite bitmap image of the page to mass storage device for storage as a new background bitmap image of the page for a next editing of the document, wherein
the new background bitmap image of the page incorporates all text and graphics data entered by a user in a present editing of the document and is unchangeable in any subsequent editing of the document, wherein
the new background bitmap image is provided to the form document editor as the background bitmap image of the page when the page is retrieved from the mass storage device for editing and the graphics editor can edit only the graphics bitmap image and the text editor can edit only the text buffer.

10. The method for editing a page of a form document of claim 13, further comprising the steps of compressing and decompressing the page image for storing the page image in and retrieving the page image from the mass storage device by:

receiving the composite bitmap image of the page and compressing the composite bitmap image of the page into a compressed format for storage in the mass storage device as the new background bitmap image of the page, and receiving a compressed new background bitmap image of a page retrieved from the mass storage device, decompressing the compressed new background bitmap image of the retrieved page to generate a decompressed new background bitmap image of the stored page, and providing the decompressed new background bitmap image of the retrieved page to the editors as the background bitmap image of the page for editing of the page.

11. The method for editing a page of a form document of claim 7, further comprising the steps of:

providing a user prompt message indicating the user data to be inserted in a user data import indicator, and by operation of the autofill parser in response to the user prompt message, providing the user prompt message to the display for display to the user.

* * * * *